United States Patent
Zhao et al.

(10) Patent No.: US 6,451,899 B1
(45) Date of Patent: Sep. 17, 2002

(54) AQUEOUS FORMULATIONS COMPRISING AT LEAST TWO DIFFERENT POLYMERS AS AQUEOUS DISPERSIONS

(75) Inventors: Cheng-Le Zhao, Schwetzingen; Uwe Dittrich, Ludwigshafen, both of (DE); Joachim Roser, Brüssel (BE); Joachim Pakusch, Speyer; Harald Röckel, Neustadt, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/700,504

(22) PCT Filed: May 19, 1999

(86) PCT No.: PCT/EP99/03443

§ 371 (c)(1),
(2), (4) Date: Nov. 20, 2000

(87) PCT Pub. No.: WO99/60064

PCT Pub. Date: Nov. 25, 1999

(30) Foreign Application Priority Data

May 20, 1998 (DE) .......................... 198 22 790

(51) Int. Cl.$^7$ .............................. C08L 31/04; C08J 3/12
(52) U.S. Cl. .................... 524/501; 524/221; 524/227; 524/228; 524/802; 524/803
(58) Field of Search ................. 524/802, 501, 524/803, 817, 819, 524, 228, 227, 221

(56) References Cited

U.S. PATENT DOCUMENTS

| | | | |
|---|---|---|---|
| 4,269,749 A | 5/1981 | Marriott et al. | |
| 5,208,285 A | 5/1993 | Boyce et al. | |
| 5,506,282 A | 4/1996 | Min et al. | |
| 5,643,993 A | * 7/1997 | Guerin | ........................ 524/524 |
| 5,703,156 A | * 12/1997 | Sauer | ........................ 524/802 |
| 5,731,377 A | 3/1998 | Friel | |

FOREIGN PATENT DOCUMENTS

| | | |
|---|---|---|
| EP | 466 409 | 1/1992 |
| EP | 716 131 | 6/1996 |
| JP | 63-135935 | 6/1988 |
| JP | 08-301907 | 11/1996 |

OTHER PUBLICATIONS

"Polymeric Materials and Processing", p. 90–92, authored by Charrier, Hanser Publishers, New York, 1991.*
Souheng WU, Journal of Macromolecular Science, vol. C10, no. 1, pp. 1–73, "Interfacial And Surface Tensions of Polymers", 1974.

* cited by examiner

*Primary Examiner*—Edward J. Cain
*Assistant Examiner*—James T. Yeh
(74) *Attorney, Agent, or Firm*—Oblon, Spivak, McClelland, Maier & Neustadt, P.C.

(57) ABSTRACT

The present invention relates to aqueous formulations comprising:

i. at least one hydrophilic particulate polymer P1, as an aqueous dispersion, composed essentially of monoethylenically unsaturated monomers having a water-solubility in the range from 10 to 100 g/l (at 25° C. and 1 bar), and ii. at least one hydrophobic particulate polymer P2, as an aqueous dispersion, composed essentially of ethylenically unsaturated monomers having a water-solubility below 10 g/l (at 25° C. and 1 bar), the glass transition temperature $T_g1$ of the polymer P1 being less than 10 K different from the glass transition temperature $T_g2$ of the polymer P2.

12 Claims, No Drawings

AQUEOUS FORMULATIONS COMPRISING AT LEAST TWO DIFFERENT POLYMERS AS AQUEOUS DISPERSIONS

The present invention relates to aqueous formulations comprising at least two different particulate polymers P1 and P2 as aqueous dispersions.

Aqueous formulations based on aqueous polymer dispersions find diverse application owing to the film-forming properties of the polymers they comprise; for example, as binders in pigmented formulations, such as emulsion paints, sealing compounds, coating compositions or asphalt compositions, in pigment-free formulations, such as varnishes and polishes, as adhesives and base materials for adhesives, and in compositions for coating paper, fibers or leather.

Formulations based on aqueous polymer dispersions frequently include two different polymers in order to adjust the properties of the polymer films which result when the polymer dispersions are dried.

U.S. Pat. No. 5,208,285 discloses an improvement to the wet adhesion of polymer films based on polyvinyl acetate dispersions by adding small amounts of a polymer dispersion whose polymer has cyclic urea groups.

EP-A 716 131 describes pigmented coating compositions comprising a very fine polymer dispersion and a coarser polymer dispersion as binders. The combination of fine and coarser dispersions improves the gloss of the coatings.

EP-A 466 409 describes a blend of two aqueous polymer dispersions whose polymers differ in their glass transition temperatures. The combination of a polymer having a glass transition temperature—<20° C. and a polymer having a glass transition temperature<20° C. produces a combination of improved film formation with higher blocking resistance of the resulting coatings.

For preparing aqueous polymer dispersions and for their further processing to appropriate aqueous formulations, it is advantageous for the polymer dispersions to be of low viscosity. The ready-to-use aqueous formulations based on the aqueous polymer dispersions, however, are frequently required to have a viscosity that lies well above the inherent viscosity of the aqueous polymer dispersions present in the formulations. Adjusting the viscosity of aqueous formulations is generally accomplished by adding a thickener. By thickeners are meant substances of high molecular mass, usually organic polymers, which swell in the liquid to be thickened and, in doing so, undergo transition to viscous, colloidal or true solutions (see Römpp, Chemielexikon, 9th edition, Thieme Verlag, Stuttgart, p.4488). Thickeners for aqueous solvents have polar functional groups, such as OH, COOH or carboxamide groups, which form hydrogen bonds with the water molecules and so bring about thickening.

The prior art aqueous formulations based on aqueous polymer dispersions always require relatively large amounts of thickeners in order to establish an appropriate processing viscosity. The use of relatively large amounts of thickeners in aqueous formulations based on polymer dispersions, however, is undesirable. Firstly, there are regularly instances of incompatibility of the polymeric thickener with the film-forming polymers of the aqueous formulations, so impairing the mechanical properties of the polymer films that result from the dispersed polymers. Secondly, thickeners frequently also act as flocculants on the dispersed polymers. Thirdly, thickeners for aqueous formulations are in many cases soluble in water, or hygroscopic, and so make the polymer films more sensitive to water.

It is an object of the present invention to provide formulations based on aqueous polymer dispersions which require smaller amounts of thickeners in order to establish an appropriate processing viscosity than do the prior art formulations.

We have found that this object is achieved and, surprisingly, that aqueous formulations based on a blend of at least two different polymer dispersions have the desired properties, if the dispersed polymers present in them differ in their hydro phobicity.

The hydrophobicity of a polymer, which is fundamentally difficult to determine experimentally (see Wu, J. Macromol. Sci-Revs. Macromol. Chem. C10 (1), 1974, 1–73), is given indirectly by the water-solubility of the monomers of which the polymer is composed. Polymers composed of at least 20% by weight of monomers having a water-solubility in the range from 10 to 100 g/l (at 25° C.) and of less than 80% by weight of monomers having a water-solubility below 10 g/l (at 25° C.) can be classed as hydrophilic polymers. Polymers composed of at least 80% by weight of monomers having a water-solubility<10 g/l (at 25° C.) and of less than 20% by weight of monomers having a water-solubility in the range from 10 to 100 g/l (at 25° C.) can be classed as hydrophobic polymers.

The present invention therefore provides aqueous formulations comprising:

i. at least one hydrophilic particulate polymer P1, as an aqueous dispersion, which is composed of ethylenically unsaturated monomers M comprising:
 from 20 to 100% by weight of at least one monoethylenically unsaturated monomer M1 having a water-solubility in the range
 from 10 to 100 g/l (at 25° C. and 1 bar),
 from 0 to 80% by weight of one or more monoethylenically unsaturated monomers M2 having a water-solubility below 10 g/l (at 25° C. and 1 bar), and
 from 0 to 20% by weight of one or more monomers M3 which are different from the monomers M1 and M2, and ii. at least one hydrophobic particulate polymer P2, as an aqueous dispersion, which is composed of ethylenically unsaturated monomers M' comprising:
 from 0 to 20% by weight of one or more monoethylenically unsaturated monomers M1' having a water-solubility in the range from 10 to 100 g/l (at 25° C. and 1 bar),
 from 80 to 100% by weight of at least one monoethylenically unsaturated monomer M2' having a water-solubility below 10 g/l (at 25° C. and 1 bar), and
 from 0 to 20% by weight of one or more monomers M3' which are different from the monomers M1' and M2', and where the glass transition temperature $T_g1$ of the polymer P1 is less than 10 K different from the glass transition temperature $T_g2$ of the polymer P2 and where the proportions by weight of the monomers M1, M2 and M3 and of the monomers M1', M2' and M3' respectively add up in each case to 100% by weight. Values for the water-solubility of ethylenically unsaturated monomers are tabulated for example in Ullmann's Encyclopedia of Industrial Chemistry, 5th ed. Vol. 21 A, VCH Publishers 1992, p. 159–161.

Examples of preferred monomers M1 and M1' are methyl methacrylate, methyl acrylate, ethyl acrylate, n- and isopropyl acrylate, vinyl acetate, acrylonitrile, methacrylonitrile and N-vinylcaprolactam, especially methyl methacrylate, acrylonitrile and vinyl acetate.

Preferred monomers M2 and M2' include $C_2$–$C_{18}$-alkyl methacrylates, such as ethyl methacrylate, n- and isopropyl methacrylate, n-butyl methacrylate, isobutyl methacrylate, tert-butyl methacrylate and 2-ethylhexyl methacrylate, $C_4$–$C_{18}$-alkyl acrylates, such as n-butyl acrylate, isobutyl acrylate, tert-butyl acrylate, n-hexyl acrylate, 2-ethylhexyl acrylate, lauryl acrylate and stearyl acrylate, vinylaromatic monomers such as styrene, α-methylstyrene, o-chlorostyrene or vinyltoluenes, vinyl esters of aliphatic $C_3$–$C_{18}$ monocarboxylic acids, such as vinyl propionate, vinyl butyrate, vinyl valerate, vinyl hexanoate, vinyl 2-ethylhexanoate, vinyl decanoate, vinyl pivalate, vinyl laurate, vinyl stearate and also commercial monomers VEOVA® 5–11 (VEOVA® X is a tradename of Shell and stands for vinyl esters of α-branched aliphatic carboxylic acids having X carbon atoms, also referred to as Versatic® X acids), $C_2$–$C_6$ olefins, such as ethylene and isobutene, conjugated dienes, such as butadiene and isoprene, vinyl chloride and vinylidene chloride.

The hydrophilic polymers P1 of the invention preferably contain from 20 to 90% by weight and especially from 30 to 85% by weight of monomers M1 and from 10 to 80% by weight and especially from 15 to 70% by weight of monomers M2 in copolymerized form.

The hydrophobic polymers P2 of the invention preferably contain not more than 15% by weight and especially not more than 10% by weight of monomers M1' and also preferably at least 85% by weight and especially at least 90% by weight of monomers M2' in copolymerized form.

Hydrophilic polymers P1 of the invention are composed, for example, of:

from 20 to 80% by weight, in particular from 30 to 70% by weight, of methyl methacrylate as monomer M1,
from 20 to 79.9% by weight, in particular from 30 to 69.9% by weight, of at least one monomer M2 selected from $C_4$–$C_8$-alkyl acrylates, styrene and α-methylstyrene, and
from 0.1 to 10% by weight, in particular from 0.1 to 5% by weight, of at least one monomer M3, or of:

from 20 to 90% by weight, in particular from 30 to 85% by weight, of vinyl acetate as monomer M1,
from 10 to 80% by weight, in particular from 15 to 70% by weight, of at least one monomer M2 selected from ethylene, the vinyl esters of aliphatic $C_3$–$C_{12}$ carboxylic acids, and $C_4$–$C_8$-alkyl acrylates, and
from 0 to 10% by weight, in particular from 0 to 5% by weight, of one or more monomers M3.

Hydrophobic polymers P2 of the invention are composed, for example, of:

from 2 to 19.9% by weight, in particular from 5 to 14.9% by weight, of methyl methacrylate as monomer M1',
from 80 to 97.9% by weight, in particular from 85 to 95% by weight, of at least one monomer M2' selected from $C_4$–$C_8$-alkyl acrylates, styrene and α-methylstyrene, and from 0.1 to 10% by weight, in particular from 0.1 to 5% by weight, and, especially, from 0.1 to 3% by weight of at least one monomer M3', or of:

from 5 to 20% by weight of vinyl acetate as monomer M1',
from 80 to 95% by weight of at least one monomer M2', selected from ethylene, the vinyl esters of aliphatic $C_3$–$C_{12}$-carboxylic acids, and $C_4$–$C_8$-alkyl acrylates, and
from 0 to 10% by weight, in particular from 0 to 5% by weight and, especially, from 0 to 3% by weight of one or more monomers of M3', or of:

from 90 to 99.9% by weight, in particular from 95 to 99.9% by weight and especially from 97 to 99.9% by weight of at least two different monomers M2', selected from the $C_4$–$C_8$-alkyl acrylates and $C_2$–$C_8$-alkylmethacrylates, and
from 0.1 to 10% by weight, in particular from 0.1 to 5% by weight and, especially, from 0.1 to 3% by weight of at least one monomer M3'.

Typical monomers M1 and monomer combinations M1/M2 for hydrophilic polymers P1 are as follows: methyl methacrylate and/or vinyl acetate as sole monomers M1; methyl methacrylate with n-butyl acrylate and/or 2-ethylhexyl acrylate with a weight ratio M1/M2 in the range from 3/7 to 7/3; methyl methacrylate with styrene and with or without n-butyl acrylate and/or 2-ethylhexyl acrylate, with a weight ratio M1/M2 in the range from 3/7 to 7/3; vinyl acetate with the vinyl ester of Versatic 10 acid and/or n-butyl acrylate with a weight ratio M1/M2 in the range from 3/7 to 7/3; vinyl acetate with ethylene and with or without vinyl esters of Versatic® 10 acid with a weight ratio M1/M2 in the range from 1/1 to 9/1.

Typical monomers M2' and monomer combinations M1'/M2' for hydrophobic polymers P2 are as follows: n-butyl methacrylate as sole monomer M2'; styrene with n-butyl acrylate and/or 2-ethylhexyl acrylate as sole monomers M2' with a weight ratio in the range from 2/8 to 8/2; methyl methacrylate with n-butyl acrylate and/or 2-ethylhexyl acrylate with a weight ratio M1'/M2' in the range from 5/95 to 15/85; vinyl acetate with the vinyl ester of Versatic® 10 acid with a weight ratio M1'/M2' in the range from 5/95 to 15/85; tert-butyl acrylate with n-butyl acrylate in a weight ratio of from 2/8 to 8/2.

Examples of suitable monomers M3 and M3' are monomers of heightened solubility in water, i.e., >100 g/l (at 25° C.). Monomers of this kind include monoethylenically unsaturated $C_3$–$C_8$ monocarboxylic acids, such as acrylic, methacrylic, crotonic, vinylacetic, acrylamidoglycolic and methacrylamidoglycolic acid, monoethylenically unsaturated $C_4$–$C_8$-dicarboxylic acids, such as maleic, itaconic and citraconic acid, their monoesters with $C_1$–$C_{12}$-alkanols, such as monomethyl maleate and mono-n-butyl maleate, ethylenically unsaturated sulfonic acids, such as vinylsulfonic, 2-acrylamido-2-methylpropanesulfonic, 2-acryloyloxyethanesulfonic and 2-methacryloyloxyethanesulfonic, 3-acryloyloxy- and 3-methacryloyloxypropanesulfonic acid, vinylbenzenesulfonic acid and salts thereof, preferably the alkali metal salts or ammonium salts and, in particular, the sodium salts. The monomers of heightened solubility in water also include neutral monomers, examples being the amides and the N-alkylolamides of ethylenically unsaturated monocarboxylic acids, such as acrylamide, methacrylamide, N-methylolacrylamide, and N-methylolmethacrylamide, the hydroxyalkylesters of the abovementioned ethylenically unsaturated mono- and dicarboxylic acids, examples being hydroxyethyl acrylate, hydroxypropyl acrylate, 4-hydroxybutyl acrylate and the corresponding methacrylates, and water-soluble N-vinyllactams, an example being N-vinylpyrrolidone. Preferred monomers of heightened solubility in water are acrylic, methacrylic, itaconic and citraconic acids and acrylamide and methacrylamide.

The abovementioned monomers of heightened solubility in water are preferably employed in an amount of from 0.1 to 10% by weight, in particular from 0.1 to 5% by weight, in the preparation of the polymers P1 and/or P2. In particular, the hydrophobic polymer P2 comprises not more than 10% by weight, preferably not more than 5% by weight and, especially, not more than 3% by weight, based on the overall weight of the monomers M', of monomers of heightened solubility in water.

Monomers M3 and M3' incorporated by copolymerization into the polymers P1 and P2 may also include, independently of one another, the monomers having cyclic urea groups that are known from U. S. Pat. No. 5,208,285, such as N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one and N-[2-((meth)acryloxyacetamido)ethyl]imidazolidin-2-one. Monomers of this kind can be used in amounts of from 0.1 to 10% by weight, in particular from 0.5 to 5% by weight, based on the overall weight of the monomers M and M'. Monomers with cyclic urea groups improve the wet adhesion of the coatings obtainable from the formulations of the invention.

In addition, both the polymer P1 and the polymer P2 may comprise, in copolymerized form, monomers having two or more nonconjugated ethylenically unsaturated double bonds, as monomers M3 and M3', examples of such monomers being the diesters of dihydric alcohols with $\alpha,\beta$-monoethylenically unsaturated $C_3$–$C_8$-carboxylic acids, such as glycol bisacrylate, or esters of $\alpha,\beta$-monoethylenically unsaturated carboxylic acids with alkenols, such as bicyclodecenyl (meth)acrylate, and also divinylbenzene, N,N'-divinylurea, N,N'-divinylimidazolinone and diallyl phthalate. Where desired, such monomers are used in minor amounts, i.e., in amounts of from 0.01 to 2% by weight based on the overall monomer amount.

The polymers P1 and P2 may also independently of one another comprise siloxane-functional monomers in copolymerized form as monomers M3 and M3', these monomers enhancing the pigment binding power of the polymers P1 and P2. Examples that may be mentioned here are vinyltrialkoxysilanes, such as vinyltrimethoxysilane, alkylvinyldialkoxysilanes or (meth)acryloyloxyalkyltrialkoxysilanes, such as (meth)acryloyloxyethyltrimethoxysilane and (meth)acryloyloxypropyltrimethoxysilane. These monomers can, where desired, be used in amounts of up to 1% by weight, preferably from 0.05 to 0.5% by weight, based on the overall monomer amount.

In accordance with the invention the glass transition temperatures of the polymers P1 and P2 are comparable: in other words, the glass transition temperature $T_g1$ of the polymer P1 and the glass transition temperature $T_g2$ of the polymer P2 differ by not more than 10 K and preferably by not more than 5 K from one another. Aqueous formulations comprising at least one hydrophilic polymer P1 and at least one hydrophobic polymer P2 as aqueous dispersions, however, also have a higher viscosity than the polymer dispersions of the prior art, even with small amounts of thickener, when the glass transition temperature of the hydrophobic polymer differs by more than 10 K from that of the hydrophilic polymer. The glass transition temperatures of the polymers P1 and P2 can be determined conventionally by means, for example, of differential calorimetry (for example, in accordance to ASTM D 3418–82).

The glass transition temperature of the polymers P1 and P2 typically lies within a range from –50 to +100° C., the specific glass transition temperature depending on the particular end use intended. For pigmented coating compositions (emulsion paints) both $T_g1$ and $T_g2$ are generally within the range from –10 to +50° C. Flexible coating compositions will generally contain polymers P1 and P2 whose glass transition temperatures $T_g1$ and $T_g2$ lie within the range from –40 to +10° C. Blocking resistant varnishes and polymer-bound paints with a low pigment content will frequently comprise polymers P1 and P2 with glass transition temperatures $T_g1$ and $T_g2$ in the range from +10 to +80° C.

In this context it proves useful to estimate the glass transition temperature $T_g$ of the polymers P1 and P2. According to Fox (T. G. Fox, Bull. Am. Phys. Soc. (Ser. II) 1, 123 [1956] and Ullmanns Enzyklopädie der technischen Chemie, Weinheim (1980), p. 17, 18) the glass transition temperature of weakly crosslinked copolymers is given for high molecular masses in good approximation by $$\frac{1}{T_g} = \frac{x^1}{T_g^1} + \frac{x^2}{T_g^2} + \cdots \frac{x^n}{T_g^n}$$

where $X^1, X^2, \ldots, X^n$ are the mass fractions 1, 2, ..., n and $T_g^1, T_g^2, \ldots, T_g^n$ the glass transition temperatures of the homopolymers of each of the monomers 1, 2, ..., n, in kelvins. The latter are known, for example, from Ullmann's Encyclopedia of Industrial Chemistry, VCH, Weinheim, Vol. A 21 (1992) p. 169 or from J. Brandrup, E.H. Immergut, Polymer Handbook 3rd ed, J. Wiley, New York 1989.

The polymer particles of the polymers P1 and P2 normally have a weight-average polymer particle diameter in the range from 10 to 1000 nm, in particular from 30 to 600 nm (determined by means of an ultracentrifuge or by photon correlation spectroscopy; on particle size determination by ultracentrifuge see e.g. W. Mächtle, Makromolekulare Chemie 185 (1984) 1025–1039, W. Mächtle, Angew. Makromolekulare Chemie 162 (1988) 35–42). It has been found advantageous if the average particle diameter of the hydrophobic polymer P1 is below 150 nm, in particular below 120 nm and, with particular preference, below 100 nm and, specifically, in the range from 50 to 90 nm. The particle diameter of the hydrophilic polymer P1 of the invention is fundamentally of minor importance. It is preferably greater than that of the hydrophobic polymer P2 and is, in particular, in the range from 50 to 300 nm and, specifically, in the range from 70 to 250 nm.

The polymers P1 and P2 of the invention are generally prepared by free-radical aqueous emulsion polymerization of the abovementioned monomers by known techniques.

Suitable free-radical polymerization initiators are in principle both peroxides, examples being hydrogen peroxide, organic peroxides and hydroperoxides, such as dibenzoyl peroxide and tert-butyl hydroperoxide, peracids, such as peroxopivalate, alkali metal and ammonium peroxodisulfates, such as sodium peroxodisulfate or ammonium peroxodisulfate, and azo compounds. It is preferred to use redox initiator systems, which are composed of at least one organic reducing agent and at least one peroxide, hydroperoxide or peracid. Particularly suitable reducing agents are sulfur compounds, such as the sodium salt of hydroxymethanesulfinic acid, sodium sulfite, sodium disulfite, sodium thiosulfate or acetone bisulfite adduct, nitrogen compounds, such as triethylamine, hydrazine and hydroxylamine, and also ascorbic, glycolic and tartaric acid. Preference is also given to those redox initiator systems which include a small amount of a metal compound which is soluble in the polymerization medium and whose metallic component is able to exist in a plurality of valence states, examples being vanadium sulfate, iron(II) sulfate or iron complexes, such as the complex of iron with ethylenediaminetetraacetic acid (as sodium salt). The amount of free-radical initiators employed, based on the overall amount of the monomers to be polymerized, is preferably from 0.1 to 2% by weight.

Surface-active substances suitable for conducting the emulsion polymerization are the emulsifiers and protective colloids which are customarily employed for these purposes. The surface-active substances are normally employed in amounts of up to 20% by weight, preferably from 0.1 to 10% by weight and, in particular, from 0.5 to 6% by weight, based on the monomers to be polymerized.

As surface-active substances it is preferred to employ exclusively emulsifiers, whose relative molecular weights, unlike those of the protective colloids, are usually below 2000. Preference is given to anionic emulsifiers or to combinations of at least one anionic and one nonionic emulsifier.

The anionic emulsifiers include alkali metal salts and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). The anionic emulsifiers also include mono- and dialkyl derivatives of sulfonylphenoxybenzenesulfonic salts, especially their sodium, potassium or calcium salts. The alkyl groups in these compounds generally have 6 to 18 and especially 6, 12 or 16 carbons. Use is frequently made of technical-grade mixtures containing from 50 to 90% by weight of the monoalkylated product. These compounds are common knowledge—for example, from U.S. Pat. No. 4,269,749 - and are obtainable commercially, for example, as Dowfax® 2 A1 (trademark of Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference to those based on oxo alcohols and naturally occurring alcohols having a linear or branched $C_{12}$–$C_{18}$-alkyl radical and a degree of ethoxylation of from 8 to 50.

Other suitable emulsifiers are given in Houben-Weyl, Methoden der organischen Chemie, Volume XIV/1, Makromolekulare Stoffe [Macromolecular substances], George-Thieme-Verlag, Stuttgart, 1961, pp. 192–208.

During the polymerization it is possible to employ regulators in amounts, for example, of from 0 to 1% by weight, based on 100% by weight of the monomers to be polymerized. These regulators reduce the molecular mass of the polymers. Examples of suitable compounds are those with a thiol group, such as tert-butyl mercaptan, tert-dodecyl mercaptan, thioglycolic acid, its esters, mercaptoethanol or mercaptopropyltrimethoxysilane.

The emulsion polymerization is generally carried out at from 30 to 130° C., preferably from 50 to 100° C. The polymerization medium can consist either of water alone or else of mixtures of water with water-miscible liquids, such as methanol, ethanol and isopropanol. Preferably, only water is used. The emulsion polymerization can be carried out either as a batch process or in the form of a feed process, including staged or gradient procedures. Preference is given to the feed process, in which the monomers are supplied to the polymerization zone in pure or in emulsified form, continuously, in stages or subject to a concentration gradient, and during their addition the polymerization is maintained. In the case of the feed process the individual components can be added to the reactor from above, in the side, or from below, through the reactor floor.

For the polymerization it is also possible to include a polymer seed (aqueous seed latex) in the initial charge, in order, for example, to more effectively establish the particle size. The seed latex generally has a weight-average particle size of from 10 to 200 nm and, in particular, from 20 to 100 nm, and, specifically, from 25 to 50 nm. Examples of its constituent monomers are styrene, methyl methacrylate, n-butyl acrylate and mixtures thereof.

The manner in which the initiator is added to the polymerization vessel in the course of the free-radical aqueous emulsion polymerization is known to the person of average skill in the art. It can either be included entirely in the initial charge to the polymerization vessel or added continuously or in stages at the rate of which it is consumed in the course of the free-radical aqueous emulsion polymerization. This will depend in each individual case, in a manner known to the skilled worker, both on the chemical nature of the initiator system and on the polymerization temperature.

In order to remove the residual monomers, it is common following polymerization to carry out physical deodorization—for example, distillative removal of the volatile monomers with steam—or chemical deodorization. In the latter case, further initiator—a redox initiator, for example—is added after the end of the emulsion polymerization proper, i.e., after a monomer conversion of at least 95%.

In this way it is possible to obtain aqueous dispersions of the polymers P1 and P2 having polymer contents of up to 70% by weight, based on the overall weight of the respective polymer dispersion. For practical reasons it is preferred to use dispersions having polymer contents in the range from 30 to 60% by weight.

The formulations of the invention are generally prepared by blending the aqueous polymer dispersions of the polymers P1 and P2 by known techniques, such as in a stirred vessel or in other mixers particularly suitable for aqueous polymer dispersions, examples being static mixers, such as static in-line mixers.

In the aqueous formulations of the invention it is advantageous if the hydrophilic polymer P1 makes up at least 50% by weight, based on the overall amount of dispersed polymer. Preferably, the proportion by weight ratio of hydrophilic polymer P1 to hydrophobic polymer P2 lies within the range from 99:1 to 50:50 and, in particular, within the range from 95:5 to 70:30.

As already mentioned, aqueous formulations based on aqueous polymer dispersions frequently contain thickeners in order to establish an appropriate processing viscosity. Thickeners for aqueous formulations are generally aqueous solutions or dispersions of polymers P3, which are different from the polymers P1 and P2 (see above). Accordingly, the present invention also provides aqueous formulations which in addition to the polymers P1 and P2 comprise at least one thickening polymer P3 in dissolved form.

Thickening polymers P3 include hydrophilic or water-soluble polymers having polar groups, e.g. hydroxyl, carboxyl or carboxamido groups, which are able to form hydrogen bonds with the water molecules. They include water-soluble organic polymers, examples being celluloses and cellulose derivatives, such as methylcellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers. Thickening polymers P3 also include inorganic polymers, examples being polysilicic acids and clay minerals such as bentonites or hectorite.

Thickening polymers P3 which are preferred in accordance with the invention are associative thickeners, examples being styrene-maleic anhydride copolymers and, in particular, hydrophobically modified polyurethanes, as are described, for example, by N. Chen et al. in J. Coatings Technology Vol. 69, No. 867, 1997, p. 73 and by R. D. Hester et al. in J. Coatings Technology, Vol. 69, No. 864, 1997, 109. The disclosure content of these documents is hereby incorporated in its entirety by reference.

Examples of hydrophobically modified polyetherurethanes are polymers of the formula

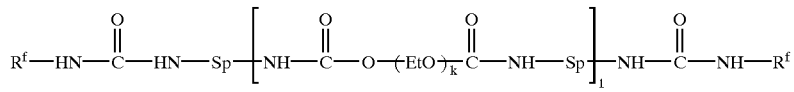

in which $R^f$ is a hydrophobic radical, preferably a linear or branched alkyl radical of 10 to 20 carbon atoms, Et is 1,2-ethylene, Sp is $C_2-C_{10}$-alkylene, cycloalkylene or arylene, k is a number from 50 to 1000 and l is a number from 1 to 10, the product k×l preferably being from 300 to 1000. The hydrophobically modified polyetherurethanes also include the products of reaction of diisocyanates or polyisocyanates with alkoxylated long-chain alkanols. Examples of suitable di- or polyisocyanates in this context are hexamethylene diisocyanate, isophorone diisocyanate, toluene diisocyanate, and the cyanurates and biurets thereof. Examples of suitable alkoxylated alkanols are ethoxylated alkanols having 8 to 22 carbon atoms (degree of ethoxylation 3 to 50).

The formulations of the invention normally include, based on their overall weight, thickening polymers P3 in amounts of from 0.01 to 5% by weight, preferably from 0.02 to 1% by weight and, in particular, from 0.05 to 0.5% by weight.

In addition to the polymers P1, P2 and P3 and depending on the intended application, the formulations of the invention normally include customary auxiliaries in an amount of from 0.1 to 20% by weight, based on the overall weight of the formulation.

Customary auxiliaries include wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also salts of naphthalenesulfonic acids, especially their sodium salts. The dispersants are generally added in an amount of from 0.1 to 0.6% by weight, based on the overall weight of the emulsion paint. In addition, the auxiliaries generally also embrace defoamers, preservatives, hydrophobicizing agents and biocides.

To establish the film-forming properties of the polymers P1 and P2 the aqueous formulations of the invention may also contain what are known as film-forming consolidating agents (plasticizers), examples being ethylene glycol, propylene glycol, butylene glycol, hexylene glycol, alkyl ethers and alkyl ether esters of glycols and polyglycols, e.g. diethylene glycol monoethyl ether, diethylene glycol monoethyl ether acetate, diethylene glycol monobutyl ether, hexylene glycol diacetate, propylene glycol monoethyl ether, propylene glycol monophenyl ether, propylene glycol monobutyl ether and propylene glycol monopropyl ether, dipropylene glycol monomethyl ether, dipropylene glycol mono-n-butyl ether, tripropylene glycol mono-n-butyl ether, and the acetates of said monoalkyl ethers, e.g. butoxybutyl acetate, and also alkyl esters of aliphatic mono- and dicarboxylic acids, e.g. Texanol® from Eastman, or technical-grade mixtures of dibutyl esters of succinic, glutaric and adipic acid. In addition, the formulations of the invention may also include, as film-forming auxiliaries, hydrocarbons and/or mixtures thereof, with or without aromatic constituents, examples being white spirits from the boiling range from 140 to 210° C. Film-forming auxiliaries are normally employed in amounts of from 0.1 to 10% by weight, based on the copolymer P1 and P2 present in the formulation.

Ready-to-use, pigment-free formulations will generally contain from 10 to 50% by weight of polymers P1 and P2, thickening polymer P3 in the amounts indicated above, up to 10% by weight of customary auxiliaries, and water to 100% by weight.

A specific embodiment of the present invention relates to pigment-containing formulations, especially in the form of emulsion paints. In these formulations, the polymers P1 and P2 act as a film-forming constituent and, at the same time, as binders for the pigment particles. Such formulations comprise—in addition to the polymers P1, P2 and optionally P3—at least one organic or inorganic solid in dispersed form, which is selected from organic or inorganic pigments and organic or inorganic extenders.

The overall solids content in the pigment-containing formulations of the invention, the solids content being composed in general of the polymers P1, P2 and P3 and of the extenders and pigments, is generally in the range from 20 to 90% by weight, based on the overall weight of the formulation. The volume ratio of polymers P1+P2 to the extenders and pigments is generally in the range from 15:85 to 85:15. In addition, the pigmented formulations also include at least one thickening polymer P3 in the amounts indicated above, and customary auxiliaries.

Typical pigments for the formulations of the invention, especially for emulsion paints, are, for example, titanium dioxide, preferably in the rutile form, barium sulfate, zinc oxide, zinc sulfide, basic lead carbonate, antimony trioxide, lithopones (zinc sulfide+barium sulfate). However, the formulations may also contain color pigments, examples being iron oxides, carbon black, and graphite. In addition to the inorganic pigments the formulations of the invention may also include organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal complex pigments.

Suitable extenders can embrace, in principle, alumosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silica, etc. The extenders can be employed as individual components. In practice, however, it has been found appropriate to use extender mixtures, examples being calcium carbonate/kaolin and calcium carbonate/talc. To increase the hiding power and to save on the use of white pigments use is frequently made in the preferred emulsion paints of finely divided extenders, examples being finely divided calcium carbonate or mixtures of different calcium carbonates of different particle sizes. To adjust the hiding power, shade and depth of color it is preferred to employ mixtures of color pigments and extenders.

The formulations of the invention are stable, fluid systems suitable for a large number of applications: for example, as pigmented coating compositions, such as emulsion paints, sealants, coating masses or asphalt masses, as pigment-free coating systems, such as clearcoats and polishes, as adhesives and adhesive base materials, and as coating compositions for paper, fibers or leather. Their advantage is to be seen in particular in the fact that even small amounts of thickeners are sufficient to establish the desired processing viscosity in each case. The consequence of this is that the quality of the polymer films formed from the polymers P1 and P2 are superior to those of the prior art polymer films.

The present invention also provides for the use of the formulations of the invention for coating substrates. Examples of common substrates are wood, concrete, metal, glass, ceramics, plastic, plaster, wallpapers, coated, primed or weathered substrates, and also paper, fibers or leather. The substrates are coated by applying the formulation to the substrate in a manner dependent on the configuration of the formulation. Depending on viscosity and pigment content of the formulation, and on the substrate, it may be applied by means of rollers, brushes or coating bars or knives, or as a spray.

The examples below are intended to illustrate the invention.

I. Analysis

The average particle size (z-average) of the polymer particles was determined by dynamic light scattering (photon correlation spectroscopy) on a 0.01% by weight dispersion in water at 23° C. using an Autosizer IIc from Malvern Instruments, England. The value stated is the cumulant z-average diameter of the measured autocorrelation function.

The glass transition temperature was determined by means of differential scanning calorimetry (DSC) in accordance with ASTM D 3418–82.

II. Preparing the Polymer Dispersions P1 and P2

Dispersion 1 (Hydrophilic Polymer)

An emulsifying vessel was used to prepare an aqueous monomer emulsion from:

302 g of deionized water
18 g of emulsifier solution 1
100 g of emulsifier solution 2
408 g of methyl methacrylate
372 g of n-butyl acrylate
12 g of methacrylic acid and
16 g of a 50% strength by weight aqueous acrylamide. solution.

A reactor was charged with 250 g of deionized water, 90 mg of the sodium salt of the iron complex of ethylenediaminetetraacetic acid and 37 g of a polystyrene seed dispersion (particle size about 30 nm, solids content about 33% by weight) and this initial charge was heated to 60° C. Then 17.7 g of aqueous initiator solution 1 and 14.7 g of aqueous initiator solution 2 were added in one portion by way of separate feed ports. Subsequently, the monomer emulsion was added over the course of 3 hours and the remaining initiator solutions over the course of 4 hours. After the end of the addition of initiator, 6.14 g of a 3.3% strength by weight aqueous tert-butyl hydroperoxide solution, 5.5 g of a 13.1% strength by weight aqueous acetone bisulfite solution and 5 g of water were introduced into the reactor, and the 60° C. maintained for 1 hour. The reaction mixture was subsequently cooled to room temperature and adjusted to a pH of 8.5 using 25% strength by weight ammonia solution. The resulting dispersion was free from coagulum and had a solids content of 49.2% by weight. The weight-average particle diameter of the polymer was 149 nm. The glass transition temperature of the polymer was 27° C.

Initiator solution 1: 18.3 g of a 13.1% strength by weight aqueous solution of the acetone bisulfite adduct 70.00 g of deionized water Initiator solution 2: 3.43 g of a 70% strength by weight aqueous tert-butyl hydroperoxide solution 70.00 g of deionized water Emulsifier solution 1: 45% strength by weight solution of sodium (dodecylsulfonylphenoxy)benzenesulfonate (Dowfax® 2 A1 from Dow Chemicals) in water Emulsifier solution 2: 30% strength by weight solution of the sodium salt of a sulfuric acid monoester mixture of $C_{10}$–$C_{16}$-alkyl ethoxylates (average EO degree 30) in water (Disponil® FES 77 from Henkel KGaA).

Dispersion 2 (Hydrophilic Polymer)

In accordance with the preparation procedure for dispersion 1, an aqueous dispersion 2 of a hydrophilic polymer P1 was prepared. The monomer emulsion employed had the following composition:

302 g of deionized water
18 g of emulsifier solution 1
100 g of emulsifier solution 2
402 g of methyl methacrylate
366 g of n-butyl acrylate
24 g of methacrylic acid
16 g of a 50% strength by weight aqueous acrylamide solution.

The resulting dispersion was free from coagulum and had a solids content of 49% by weight. The pH of the dispersion was 8.0. The weight-average particle diameter of the polymer was 140 nm. The glass transition temperature of the polymer was 29° C.

Dispersion D3 (Hydrophobic Polymer)

An emulsifying vessel was used to prepare an aqueous monomer emulsion from:

342.2 g of deionized water
7.8 g of emulsifier solution 1
175.0 g of tert-butyl methacrylate
166.3 g of n-butyl acrylate and
8.8 g of acrylic acid.

A reactor was charged with 235 g of deionized water and 38.9 g of emulsifier solution 1, and this initial charge was heated to 85° C. Then 4.4 g of aqueous initiator solution were added in one portion. Subsequently, by way of separate feed ports, the monomer emulsion was added over the course of 2 hours and the remaining initiator solution over the course of 2.25 hours. After the end of the addition of initiator the 85° C. were maintained for 2 hours and then the reaction mixture was cooled to room temperature. The resulting dispersion contained less than 1 g of coagulum and had a solids content of 33.6% by weight. The weight-average particle diameter of the polymer was 80 nm. The glass transition temperature of the polymer was 24° C.

Initiator solution: 0.88 g of sodium peroxodisulfate 88.00 g of deionized water

Dispersion 4 (Hydrophilic Polymer)

In accordance with the preparation procedure for dispersion 3 an aqueous dispersion 4 of a hydrophilic polymer P1 was prepared. The monomer emulsion employed had the following composition:

---
342.0 g of deionized water
7.8 g of emulsifier solution 1
175.0 g of methyl methacrylate
166.3 g of n-butyl acrylate
8.8 g of acrylic acid.
---

The resulting dispersion contained less than 1 g of coagulum and had a solids content of 34.6% by weight. The weight-average particle diameter of the polymer was 72 nm. The glass transition temperature of the polymer was 22° C.

III. Preparing the Formulations of the Invention (Blends B1 to B4, Comparative Blends CB1 to CB3):

By blending dispersions D1 to D4 in a beaker the following blends of the invention were prepared from the dispersions:

Blend B1: 95 pbw of Dispersion 1 and 5 pbw of Dispersion 3

Blend B2: 90 pbw of Dispersion 1 and 10 pbw of Dispersion 3

Blend B3: 80 pbw of Dispersion 1 and 25 pbw of Dispersion 3

Blend B4: 90 pbw of Dispersion 2 and 10 pbw of Dispersion 3

Blend CB1*: 90 pbw of Dispersion 1 and 10 pbw of Dispersion 4

Blend CB2*: 90 pbw of Dispersion 2 and 10 pbw of Dispersion 4

Blend CB3*: 80 pbw of Dispersion 2 and 10 pbw of Dispersion 4 pbw=parts by weight

* not according to the invention

IV. Preparing Pigmented Formulations of the Invention (as Emulsion Paints EP1 to EP4, Comparative Examples CEP1 to CEP5)

The blends B1 to B4 and CB1 to CB3 and the dispersions D1 and D2 were adjusted to a solids content of 47.5% by weight. They were then used to formulate emulsion paints having a pigment volume concentration p.v.c.* of 32. To do this, the following components were mixed in the stated sequence:

---
91.14 g of water
31.90 g propylene glycol
1.37 g of thickener[1]
---

-continued

---
1.82 g of 2-amino-2-methylpropanol with 5% water
1.82 g of defoamer[2]
2.73 g of dispersant[3]
1.82 g of a commercial biocide[4]
3.00 g of an aqueous dispersion of an associative thickener[5]
105.07 g of titaniumdioxide pigment[6]
45.57 g of pigment[7]
22.79 g of feldspar[8]
70.00 g of water
10.94 g of dipropylene glycol mono-n-butyl ether
1.82 g of defoamer[2]
460.50 g of polymer blend (47.5% by weight)
10.94 g of 20% strength by weight aqueous solution of an associative thickener[9]
5.47 g of fungicide[10] and
31.30 g of water.
---

[1]Natrosol ® Plus GR.331 from Hercules GmbH, Düsseldorf,
[2]Foammaster VL from Henkel KGaA
[3]30% strength by weight aqueous solution of an ammonium polyacrylate; Pigmentverteiler MD20 from BASF AG, Ludwigshafen
[4]Proxel ®GXL from Zeneca GmbH, Frankfurt
[5]Dispersion of a hydrophobically modified polyether-urethane; Collacral PU 85 from BASF
[6]Tiona RCL 535, titanium dioxide pigment from Mellenium Inorg. Chemistry, Baltimore
[7]Burgess ® 28 from Burgess Pigment Co., Sandersville, Georgia
[8]Minex ® 4 from Unimin Speciality Minerals Inc. Elco/Illinois; Na/K alumosilicate, average particle size 7.5 μm
[9]20% by weight solution of an associatively thickening polyurethane, Acrysol RM 2020 from Rohm and Haas Deutschland GmbH, Frankfurt
[10]Nuocid ®0 404 D, fungicide from Huls America Inc., Piscataway, New Jersey.

The resulting dispersions were analyzed for their viscosity at low shear rate (Stormer viscosity) and at high shear rate (ICI viscosity). The viscosity figures for the paints (in Krebs units (KU) and in poise (P)) are compiled in Table 1.

* The pigment volume concentration p.v.c. is the ratio of pigment volume to overall solids volume (pigment+polymer), multiplied by 100.

TABLE 1

| Example | Binder | Stormer viscosity [KU][1] | ICI viscosity [P][2] |
|---|---|---|---|
| 1 | B1 | 104 | 0.80 |
| 2 | B2 | 107 | 0.80 |
| 3 | B3 | 100 | 0.80 |
| 4 | B4 | 102 | 0.73 |
| C1 | D1 | 81 | 0.55 |
| C2 | D2 | 73 | 0.53 |
| C3 | CB1 | 88 | 0.68 |
| C4 | CB2 | 79 | 0.58 |
| C5 | CB3 | 80 | 0.58 |

[1]The Stormer viscosity was determined in accordance with ASTM D 562-81 (KU = Krebs units).
[2]The ICI viscosity was determined in accordance with ASTM D 4287-94 (P = poise).

We claim:

1. An aqueous formulation comprising a blend of an aqueous dispersion comprising:
   i. at least one hydrophilic particulate polymer P1, as an aqueous dispersion, which is composed of ethylenically unsaturated monomers M comprising: from 20 to 100% by weight of at least one monoethylenic ally unsaturated monomer M1 having a water-solubility in the range from 10 to 100 g/l (at 25° C. and 1 bar),
   from 0 to less than 80% by weight of one or more monoethylenically unsaturated monomers M2 having a water-solubility below 10 g/l (at 25° C. and 1 bar), and from 0 to 20% by weight of one or more monomers M3 which are different from the monomers M1 and M2, and ii. at least one hydrophobic particulate polymer P2, as an aqueous dispersion, which is composed of ethylenically unsaturated monomers M' comprising: from 0 to less than 20% by weight of one or more monoethylenically unsaturated monomers M1' having a water-solubility in the range from 10 to 100 g/l (at 25° C. and 1 bar), from 80 to 100% by weight of at least one monoethylenically unsaturated monomer M2' having a water-solubility below 10 g/l (at 25° C. and 1 bar), and from 0 to 20% by weight of one or more monomers M3' which are different from the monomers M1' and M2', and where the glass transition temperature $T_g1$ of the polymer P1 is less than 10 K different from the glass transition temperature $T_g2$ of the polymer P2 and where the proportions by weight of the monomers M1, M2 and M3 and of the monomers M1', M2' and M3' respectively add up in each case to 100 by weight.

2. A formulation as claimed in claim 1 wherein the monomers M1 and M1' are selected independently of one another from methyl methacrylate, methyl acrylate, ethyl acrylate, n- and isopropyl acrylate, vinyl acetate, acrylonitrile, methacrylonitrile and N-vinylcaprolactam.

3. A formulation as claimed in claim 1 wherein the monomers M2 and M2' are selected independently of one another from $C_2$–$C_{18}$-alkyl methacrylates, $C_4$–$C_{18}$-alkyl acrylates, vinyl-aromatic monomers, $C_2$–$C_6$-olefins, conjugated dienes, vinyl chloride, vinylidene chloride and the vinyl esters of aliphatic $C_3$–$C_{18}$ carboxylic acids.

4. A formulation as claimed in claim 3 wherein the hydrophilic polymer P1 is composed of from:

from 20 to 80% by weight of methyl methacrylate as monomer M1, from 20 to 79.9% by weight, of at least one monomer M2 selected from $C_4$–$C_8$-alkyl acrylates, styrene and α-methyl-styrene, and from 0.1 to 10% by weight of at least one monomer M3, or of:

from 20 to 90% by weight of vinyl acetate as monomer M1, from 10 to less than 80% by weight of at least one monomer M2 selected from ethylene, the vinyl esters of aliphatic $C_3$–$C_{12}$ carboxylic acids, and $C_4$–$C_8$-alkyl acrylates, and from 0 to 10% by weight of one or more monomers M3.

5. A formulation as claimed in claim 3 wherein the hydrophobic polymer P2 is composed of:

from 2 to 19.9% by weight of methylmethacrylate as monomer M1', from 80 to 97.9% by weight of at least one monomer M2' selected from $C_4$–$C_8$-alkyl acrylates, styrene and α-methylstyrene, and from 0.1 to 10% by weight of at least one monomer M3', or of:

from 5 to less than 20% by weight of vinyl acetate as monomer M1', from 80 to 95% by weight of at least one monomer M2', selected from ethylene, the vinyl esters of aliphatic $C_3$–$C_{12}$ carboxylic acids, and $C_4C_8$-alkyl acrylates, and from 0 to 10% by weight of one or more monomers M3', or of:

from 90 to 99.9% by weight of at least two different monomers M2', selected from $C_4$–$C_8$-alkyl acrylates and $C_2$–$C_8$-alkyl methacrylates, and from 0.1 to 10% by weight of at least one monomer M3'.

6. A formulation as claimed in claim 1 comprising in addition to the polymers P1 and P2, at least one thickening polymer.

7. A formulation as claimed in claim 6 comprising from 0.01 to 5% by weight, based on the overall weight of the formulation, of the thickening polymer.

8. A formulation as claimed in claim 1 wherein the hydrophobic particulate polymer P2 has a weight-average particle diameter below 150 nm.

9. A formulation as claimed in claim 1 wherein, the weight ratio of the polymers P1 to P2 is from 99:1 to 1:1.

10. A formulation as claimed in claim 1 comprising in addition to the polymers P1 and P2 at least one solid in disperse form selected from organic or inorganic pigments and organic or inorganic extenders.

11. A method of coating a substrate, comprising applying to said substrate an aqueous formulation according to claim 1.

12. A formulation as claimed in claim 1, wherein the glass transition temperature Tg1 of the polymer P1 is not more than 5 K different from the glass transition temperature Tg2 of the polymer P2.

* * * * *